United States Patent
Laumen et al.

(10) Patent No.: US 8,731,587 B2
(45) Date of Patent: *May 20, 2014

(54) METHOD FOR TRANSMITTING MESSAGES IN A TELECOMMUNICATIONS NETWORK

(75) Inventors: Josef Laumen, Hildesheim (DE); Joerg Reinecke, Sickte (DE); Frank Schange, Hildesheim (DE); Gunnar Schmidt, Wolfenbuettel (DE)

(73) Assignee: IPCom GmbH & Co. KG (DE)

( * ) Notice: Subject to any disclaimer, the term of this patent is extended or adjusted under 35 U.S.C. 154(b) by 1027 days.

This patent is subject to a terminal disclaimer.

(21) Appl. No.: 11/975,428

(22) Filed: Oct. 19, 2007

(65) Prior Publication Data

US 2008/0274758 A1 Nov. 6, 2008

Related U.S. Application Data

(63) Continuation of application No. 10/182,687, filed as application No. PCT/DE01/00285 on Jan. 25, 2001, now Pat. No. 7,333,822.

(30) Foreign Application Priority Data

Feb. 2, 2000 (DE) .................................. 100 04 260

(51) Int. Cl.
*H04W 4/00* (2009.01)

(52) U.S. Cl.
USPC ...................... 455/466; 455/412.1; 455/412.2; 455/414.1; 455/418; 455/419; 455/420; 370/310; 370/310.2; 370/312; 370/313; 370/338

(58) Field of Classification Search
USPC ........ 455/412.1, 412.2, 414.1, 418–420, 466; 370/310, 310.2, 312, 313, 338
See application file for complete search history.

(56) References Cited

U.S. PATENT DOCUMENTS

| | | |
|---|---|---|
| 5,625,670 A | 4/1997 | Campana et al. |
| 5,742,668 A | 4/1998 | Pepe et al. |
| 5,905,879 A | 5/1999 | Lambrecht |
| 5,946,629 A | 8/1999 | Sawyer et al. |
| 6,038,296 A | 3/2000 | Brunson et al. |
| 6,195,345 B1 | 2/2001 | Kramer |
| 6,205,330 B1 | 3/2001 | Winbladh |
| 6,556,586 B1 | 4/2003 | Sipila |

(Continued)

FOREIGN PATENT DOCUMENTS

| | | |
|---|---|---|
| EP | 777 394 | 6/1997 |
| EP | 1 091 601 | 4/2001 |

(Continued)

OTHER PUBLICATIONS

3G TS 23.140 V1.0.0, Multimedia Messaging Service; Functional Description; Stage 2 (Dec. 1999) ("MMS Dec. 1999").

(Continued)

*Primary Examiner* — Steve D Agosta
(74) *Attorney, Agent, or Firm* — Kilpatrick Townsend & Stockton LLP

(57) ABSTRACT

A method is provided for transmitting messages, for example, in a telecommunications network, in which a first message service and a second message service are available. Dedicated messages of the first message service are sent using messages of the second message service. An exemplary method according to the present invention may permit an optimized transmission scheme to be maintained for the dedicated messages of the first message service.

26 Claims, 4 Drawing Sheets

(56) References Cited

U.S. PATENT DOCUMENTS

| | | |
|---|---|---|
| 6,721,398 B1 | 4/2004 | Pitcher |
| 6,728,548 B1 | 4/2004 | Willhoff |
| 6,795,711 B1 | 9/2004 | Sivula |

FOREIGN PATENT DOCUMENTS

| | | |
|---|---|---|
| JP | 11187155 | 7/1999 |
| JP | 11511608 T | 10/1999 |
| WO | WO9708906 | 3/1997 |
| WO | WO9952247 | 10/1999 |
| WO | WO 99/66746 | 12/1999 |
| WO | WO0113656 | 2/2001 |

OTHER PUBLICATIONS

3G TS 22.140 version 0.1.0 Multimedia Messaging Service (Jul. 1999) ("MMS Jul. 1999").

Wireless Application Protocol, Wireless Session Protocol Specification, Wireless Application Protocol Forum, Ltd., Apr. 30, 1998 ("WAP WSP Spec.").

Wireless Application Protocol, Wireless Control Message Protocol Specification, Wireless Application Protocol Forum, Ltd., Aug. 4, 1999 ("WAP WCMP Spec.").

Digital cellular telecommunications system (Phase 2+); Technical realization of the Short Message Service (SMS); Point-to-Point (PP). GSM 03.40 V7.1.0, Nov. 1998, pp. 1-118.

3$^{rd}$ Generation Partnership Project; Technical Specification Group Terminals; Technical realization of the Short Message Service (SMS); Point-to-Point (PP). 3G TS 23.040 V3.2.0, Oct. 1999, pp. 1-119.

3$^{rd}$ Generation Partnership Project; Technical Specification Group Terminals; Multimedia Message Service (MMS); Functional description; Stage 2. 3G TS 23.140, version 0.2.0, Nov. 1999, pp. 1-30.

WAP Architecture and WAP WDP, version Apr. 30, 1998, Various pp. 1-50.

L. Peterson et al. "Computer Networks—A Systems Approach", Morgan Kaufmann 1996, pp. 29-35.

WAP WCMP, version Jun. 1998, Version 12, pp. 1-20.

3G TS 23.140 V3.0.1 (Mar. 2000), Release 1999, 1 sheet of p. 5.

Draft T2#6/SMG4 Report V0.4 (Oct. 1999), Oct. 4-6, 1999, 1 sheet of p. 6, Kyongju, Korea.

3$^{rd}$ Generation Partnership Project; Technical Specification Group Terminals; Multimedia Messaging Service (MMS); Functional Description; Stage 2 (3G TS 23.140 Version 1.0.0), 3G TS 23.140 V1.0.0 (Dec. 1999), pp. 1-26.

3$^{rd}$ Generation Partnership Project; Technical Specification Group Core Network; Point-Point (PP) Short Message Service (SMS) Support on Mobile Radio Interface (3G TS 24.011 version 3.10), 3G TS 24.011 v33.1.0 (Dec. 1999), pp. 1-88.

3$^{rd}$ Generation Partnership Project; Technical Specification Group Terminals; Technical Realization of the Short Message Service (SMS) (3G TS 23.040 version 3.3.0), 3G TS 23.040 v3.3.0 (Dec. 1999) pp. 1-119.

ETSI Rules of Procedure, Mar. 29, 2007.

ETSI Rules of Procedure, Nov. 22, 2006.

ETSI Guide on IPRs, Jan. 25, 2007.

Analysis of Patents Declared as Essential to GMS as of Jun. 6, 2007, Fairfield Resources International Dec. 31, 2007.

Analysis of Patents Declared as Essential to WCDMA as of Dec. 31, 2005, Fairfield Resources International Nov. 21, 2007.

Decision of Commission of Jun. 15, 2005.

"First Instance Decision dated Dec. 30, 2009 in European Patent Office opposition proceedings", EP-B 1256241 Dec. 30, 2009.

Right of Appeal Notice, Reexamination Control No. 95/001,211, Aug. 27, 2010 , 1-32.

"WAP Push Message, Version 16, Wireless Application Protocol Push Message Specification", Aug. 1999.

"WAP Push OTA Protocol, Version 08, Wireless Application Protocol Push OTA Protocol Specification", Nov. 1999.

"Declaration of Karl Heinz Rosenbrock", Aug. 20, 2007.

"Expert Report and Disclosure of Sir Jeremy Lever KCMG QC and Anneli Howard on behalf of Respondents", *Nokia Corporation and Nokia, Inc.*, v. *Qualcomm Incorporated*, In the Court of Chancery of the State of Delaware in and for New Castle County Jan. 11, 2007.

"Expert Report of Sir David Edwards and James Segan", Nokia Corproation, Nokia Incorporated and Qualcomm Incorporated, Court of Chancery of the State of Delaware (at least as early as ) Sep. 29, 2006.

"Figures Provided by Strategy Analytics", (at least as early as Dec. 1, 2006).

"IPR Online Database", Aug. 2, 2008.

"Statement of Federal Trade Commission", (at least as early as Mar. 27, 2002).

"WAP Service Indication," Version Nov. 8, 1999, Wireless Application Protocol Service Indication Specification, 26 pages.

U.S. Inter Partes Reexamination No. 95/001,211, "Decision on Appeal," May 30, 2013, 23 pages.

METHOD FOR TRANSMITTING MESSAGES IN A TELECOMMUNICATIONS NETWORK

CROSS-REFERENCE TO RELATED APPLICATIONS

This application is a Continuation Application of prior U.S. patent application Ser. No. 10/182,687 filed Oct. 29, 2002, which was a National Stage Application of PCT International Application of PCT/DE2001/0285 filed Jan. 25, 2001, which claimed priority to German Patent Application No. 10004260.0 filed Feb. 2, 2000, all of which are incorporated herein by reference in their entirety.

FIELD OF THE INVENTION

The present invention relates to a method for transmitting messages in a telecommunications network, in which a first message service and a second message service are available.

BACKGROUND INFORMATION

Although it may be used in principle for any multimedia message service and telecommunications network, an exemplary embodiment according to the present invention and the problem on which it is based are explained with regard to the MMS service (MMS=Multimedia Messaging Service), which is specified within the framework of the standardization of 3GPP (3rd Generation Project Program) and may be used, for example, in the GSM system (GSM=Global System for Mobile Communications) and the UMTS system (UMTS=Universal Mobile Telecommunication System).

There exists short message services, which may be used to send a short message to a subscriber of the telecommunications network without first having to establish a telecommunications connection to the subscriber.

This may be important in mobile radio communication systems such as GSM, since their subscribers may not be reached. In this context, incoming short messages for the subscriber may be stored by a telecommunications carrier of the telecommunications network, when the subscriber cannot be reached. At a later time, when the subscriber may be reached again, the short message is then automatically transmitted to the subscriber.

The SMS service (SMS=Short Message Service) is a short message service following the GSM standard. In this context, up to 160 7-bit ASCII message characters (ASCII=American Standard Code for Information Interchange) may be transmitted in a short message. Concatenated short messages permit the transmission of longer texts. Since only text transmission according to the GSM standard is provided, binary data, such as audio data, image data, etc., should be converted to text format when transmitted, and reconverted to binary format after being received.

In this process, it may only be possible to access the entire content of a short message. In this manner, data of the short message, which the addressed subscriber may not desire, may be transmitted to the subscriber, who only receives an overview of the content of the short message after having received the complete short message from the telecommunications carrier.

FIG. 4 shows the principal structure of a first type A of an SMS short message in GSM.

In general, an SMS short message SM of the first type A includes a header SM-H and a data portion SM-D. Header SM-H includes signaling inputs and the receiver address of a message to be sent, and the sender address of a message to be received. Data portion SM-D includes the actual message to be transmitted.

Transmitters and receivers are identified by the MSISDN (Mobile Subscriber Integrated Services Digital Network) number in accordance with GSM 03.40 V7.1.0 (November 1998) Technical Realization of the Short Message Service (SMS); Point-to-Point (PP) and 3G 23.040 V3.2.0 (October 1999) Technical Realization of the Short Message Service (SMS); and Point-to-Point (PP).

A second header (user data header SM-DH) may optionally be present in data portion SM-D. If so, then the presence of the second header is indicated by a corresponding signaling input in header SM-H. Various types of SMS user data headers are already specified in GSM 03.40/3G 23.040. Different types of user data headers SM-DH are distinguished by an identification element in user data header SM-DH.

The concatenation of short messages SM may be controlled, for example, by a user data header SM-DH (identifier: "08" hexadecimal). A further example of a user data header SM-DH is the "Wireless Control Message Protocol", which is indicated by the identifier "09" in hexadecimal notation. This may be required for the Wireless Application Protocol (WAP).

FIG. 5 shows the principal structure of a second type B of an SMS short message in GSM.

In this case, an SMS short message SM' may include a header SM-H' and a data portion SM-D'. Header SM-H' includes signaling inputs and the receiver address of a message to be sent, and the sender address of a message to be received. Data portion SM-D' includes the actual message to be transmitted.

Header SM-H' includes a field, which is 8 bits wide and referred to as the TP-PID (Transfer Protocol-Protocol Identifier). Parameter TP-PID may be used to establish the applied protocol. For example, it may be used to realize telematic interworking or to determine how messages are handled in the cellular phone or SMSC (short message service center).

In telematic interworking, the TP-PID is a bit pattern of the form <001xxxxx>, that is, bit 7=0, bit 6=0, and bit 5=1.

If this bit pattern appears in the TP-PID of header SM-H' of an SMS short message SM' sent by a cellular phone, then the SMSC (Short Message Service Center) is induced to convert the present SMS to a different data format and/or to execute a certain communications protocol. In this manner, e.g., a fax of the group 3 may be sent by a cellular phone to a fax machine in the fixed network. In this case, the value of the entire TP-PID octet is <00100010>.

If this bit pattern appears in the TP-PID of header SM-H' of an SMS short message SM' received by a cellular phone, then the SMSC has received a message from a non-SMS telematic service and converted it to an SMS. In this manner, e.g., an Internet e-mail may be sent from any e-mail account in the fixed network, via the service center, to a cellular phone. In this case, the value of the received TP-PID octet is <00110010>.

In the case of handling messages, the TP-PID is a bit pattern of the form <01xxxxxx>, that is, bit 7=0, and bit 6=1.

If this bit pattern appears in the TP-PID of the header SM-H' of an SMS short message SM' received by a cellular phone, then the SMSC causes the cellular phone to handle the message in a certain manner. In this manner, e.g., a cellular phone may be induced by the SMSC to relay the received message to the SIM (subscriber identity module), where it is then processed further in accordance with SIM application toolkits. In this case, the value of the received TP-PID octet is <01111111>.

If this bit pattern appears in the TP-PID of the header SM-H' of an SMS short message SM' sent by a cellular phone, then, e.g., in the case of the bit pattern <01000001>, the SMSC is caused to overwrite an already present short message of the same cellular phone with the received short message.

The MMS service is intended to permit the transmission and reception of multimedia messages, using a cellular phone. The current (temporary) state of standardization of MMS is found in 3G TS 23.140, MMS Stage 2, v.1.0.0. In contrast to an SMS short message, a multimedia message (MM) should not be limited to a certain length or to the display of only text. An MM should instead support various types of media.

The MMS relay has a central function in the MMS service. As shown in 3G TS 23.140, MMS Stage 2, v.1.0.0, this element may be connected to various servers (e.g. an email server, fax server, voice mailbox, and MMS server), using a large variety of media. Its purpose is to grant the mobile user access to all of the information/messages on the above-mentioned servers.

Thus, the MMS relay allows the mobile user access to e-mails on the e-mail server, or to faxes stored on a fax server, or to voice messages recorded in a voice mailbox, etc. Aside from the receipt of messages, the mobile user may write messages and send them to the desired recipient via the MMS relay.

3G TS 23.140, MMS Stage 2, v.1.0.0, provides for, inter alia, the user of the MMS service logging on to his MMS service provider (session establishment). The user may then obtain a receipt for the log-on (receipt), depending on a service profile. If the MMS server contains unread messages for the user, then the user may receive a message (notification) in accordance with his/her service profile.

In this regard, an MMS server may stand for one or more arbitrary servers, e.g., one or more e-mail servers, fax servers, special MMS servers (if an independent MM format is standardized), or an arbitrary combinations of these servers.

In the same way, the user may receive a message in accordance with his/her service profile, when a new message arrives at the MMS server during an MMS session.

If his/her profile is set up so that the user does not automatically receive notification of unread and/or new MM messages, then, according to the specification, the MMS service should allow the user to explicitly request such a notification from the MMS relay (explicit notification query).

In the service profile, the user may also specify whether he/she would like to receive a confirmation of the success of transmitting the MM's to other users from the service provider. In this connection, one may distinguish between two types.

The user may receive a reply from the MMS relay indicating that his/her sent message was successfully sent to the relay via the air interface:
(ACK/NACK submission 1: positive/negative acknowledgment of submission to relay).

In addition, the user may receive a reply from the receiver and/or from the MMS relay indicating that the receiver successfully received the message:
ACK/NACK submission 2=positive/negative end-to-end acknowledgment of submission to receiver.

The MMS service should also optionally permit the service provider (the MMS relay) to receive a reply regarding the success/failure of the delivery of an MM to a subscriber:
ACK/NACK delivery.

3G TS 23.140, MMS Stage 2, v.1.0.0, 3GPP TSG T WG 2, November 1999, also provides for the triggering of automatic downloading of messages by an SMS (pull-push).

The above-described functionality and messages regarding the MM are written in the applications level, but their implementation is open. This functionality and the messages, as well as similar functionality and messages, may be implemented in many different forms.

It is believed that a general problem is that, in the MMS message service, different types of messages are sent, such as the above-mentioned notifications from the system and actual user messages, whereby the latter may be varied in content, for example, short text messages or long video, audio, or other messages. As a result, it is believed that there is no transmission scheme that is equally optimized for all messages.

SUMMARY OF THE INVENTION

An object of an exemplary embodiment according to the present invention is that predetermined messages of the first message service are sent using messages of the second message service.

It is believed that an exemplary method according to the present invention has an advantage in that an optimized transmission scheme may be maintained for the dedicated messages of the first message service.

With respect to an exemplary method according to the present invention, the SMS message service selects a transmission scheme that provides for simple sending for the dedicated messages in the MMS. Therefore, line-oriented transmission, e.g., using GSM circuit switched data or GPRS general packet radio service or UMTS circuit or packet switched data that are associated with much overhead for setting up a connection/session, may be dispensed with.

An exemplary method according to the present invention provides for messages of the second message service to be sent between the transmitter and the receiver without line-oriented transmission.

According to another exemplary method of the present invention, a dedicated, second group of messages of the first message service is sent between the transmitter and the receiver, using line-oriented transmission.

Yet another exemplary method according to the present invention provides for the first message service to include a multimedia message service, for example, the MMS message service, and/or provides for the second message service to include a short message service, for example, the SMS message service.

Still another exemplary method according to the present invention provides for the first message service to include the MMS message service and the second message service to include the SMS message service. In this context, the dedicated, first group of messages of the first message service includes at least one of the following messages:
ÿ dedicated MMS user messages (e.g. short text messages).
ÿ notification of the presence of a message on the MMS server (notification).
ÿ logging on to an MMS session (session establishment).
ÿ receipt for this log-on (receipt).
ÿ explicit request for a notification from the MMS relay (explicit notification query).
ÿ confirmation of the reception of sent MM's in the relay (ACK/NACK_submission_1).
ÿ confirmation of the success in sending an MM's to other users (ACK/NACK_submission_2).
ÿ acknowledgment of the success/failure in delivering an MM (ACK/NACK_delivery).

ÿ triggering the automatic MM-download (pull-push).

It is believed that an advantage of an exemplary method according to the present invention is that SMS already exists, and the use of this service therefore facilitates the market introduction and acceptance of MMS. SMS permits a reliable service for the above-mentioned notifications. When SMS is used, additional signaling for transmitting notifications is not required. SMS offers a bandwidth-friendly service for such simple notifications, this service also being simultaneously usable for ongoing connections or sessions in the GSM, GPRS, and UMTS systems. SMS is also available in second generation cellular phones (e.g. GSM). Therefore, a user may use essential features of the MMS service without requiring a third generation cellular phone (e.g. UMTS), which may be expensive.

According to another exemplary method of the present invention, the SMS short message is provided with a data portion, which has at least one of the following elements for establishing the message of the first message service: identification of the type of message of the first message service and/or content of the message of the first message service.

According to yet another exemplary method of the present invention, the length of the message of the first message service is specified as a further element for establishing the message of the first message service.

Still another exemplary method according to the present invention provides for at least a portion of the elements being accommodated in a user-data header of the SMS short message.

Yet another exemplary method according to the present invention provides for the user-data header being constructed in WCMP format, in which the message of the first message service is embedded.

According to still another exemplary method of the present invention, the SMS short message is provided with a header, which has an identifier for indicating the presence of a message of the first message service in the data portion.

DETAILED DESCRIPTION

In FIGS. 1 through 5, identical reference symbols denote identical or functionally equivalent elements.

Figure 1:
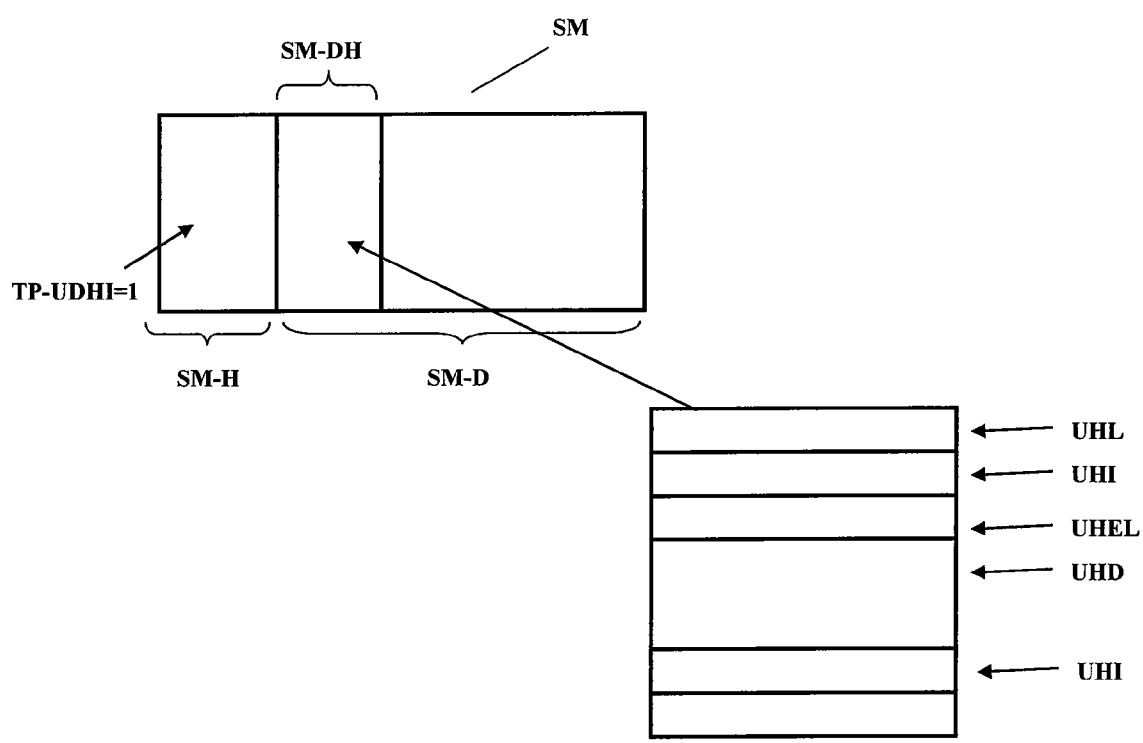
FIG. 1 shows the structure of an SMS short message of the first type A in GSM in accordance with a first exemplary method of the present invention.

FIG. 1 shows the structure of an SMS short message of the first type A in GSM in accordance with a first exemplary method of the present invention.

In the first exemplary embodiment, the first message service is the MMS message service, the second message service is the SMS message service, and the dedicated, first group of messages of the MMS message service includes:

ÿ dedicated MMS user messages (e.g. short text messages).

ÿ notification of the presence of a message on the MMS server (notification).

ÿ logging on to an MMS session (session establishment).

ÿ receipt for this log-on (receipt).

ÿ explicit request for a notification from the MMS relay (explicit notification query).

ÿ confirmation of the reception of sent MM's in the relay (ACK/NACK_submission_1).

ÿ confirmation of the success in sending MM's to other users (ACK/NACK_submission_2).

ÿ acknowledgment of the success/failure in delivering an MM (ACK/NACK_delivery).

ÿ triggering the automatic MM-download (pull-push).

FIG. 1 shows user-data header SM-DH of a type-A SMS short message for establishing a session with the MMS service.

In header SM-H, the presence of a user-data header SM-DH is indicated by flag TP-UDHI=1 in accordance with the standards GSM 03.40 V7.1.0 (November 1998) Technical Realization of the Short Message Service (SMS); Point-to-Point (PP) und 3G 23.040 V3.2.0 (October 1999) Technical Realization of the Short Message Service (SMS); and Point-to-Point (PP).

The formatting of user-data header SM-DH also conforms to the standards. User-data header SM-DH begins with user-data header length UHL followed by identification UHI of the first header element which, for example, may include the MMS session establishment header (hex. 22). This is then followed by length UHEL of the first header element which, for example, may include the necessary length for the MMS session establishment header information. Finally, the MMS session establishment header data fields UHD are provided, which may include, for example, the user ID and the user profile ID. Using the user ID, the user authenticates himself to his/her service provider, and using the profile ID, the user selects the service/user profile desired for this MMS session.

This information in the user-data header SM-DH may be succeeded by further user data header elements, e.g., for SMS concatenation, and, for example, beginning with identification UHI' of the second header element, the further user data header elements being constructed in a manner analogous to the first header element.

If only the MMS session establishment header (hex. 22 in the example) is present, the above-mentioned standard stipulates that the necessary SMS header/SMS user data header fields be encoded as follows:

SMS header: TP-UDHI=1 (user data header is present),

SMS User Data Header:

ÿ UDHL=user data header length UHL.

ÿ IEI=UHI=22 (user data header identification=hex. 22 for MMS session establishment).

ÿ IEIDL=length of this user data header element UHEL.

ÿ further information: user ID, profile ID.

ÿ SMS data: empty, or additional SMS user data header or text message.

A unique user data header indicator UHI should be defined for each type of dedicated MMS message.

A mapping table may appear as follows:

TABLE 1

Exemplary Assignment of Information Element Identifiers (IEI)

| Type of Dedicated MMS Message | IEI-Code |
|---|---|
| MMS user message | 20 |
| MMS notification | 21 |

TABLE 1-continued

Exemplary Assignment of Information Element Identifiers (IEI)

| Type of Dedicated MMS Message | IEI-Code |
| --- | --- |
| MMS session establishment | 22 |
| MMS receipt (of establishment) | 23 |
| MMS explicit notification-query | 24 |
| MMS ACK/NACK of submission (1) | 25 |
| MMS ACK/NACK of submission (2) | 26 |
| MMS ACK/NACK of delivery | 27 |
| MMS pull-push | 28 |

Figure 2:
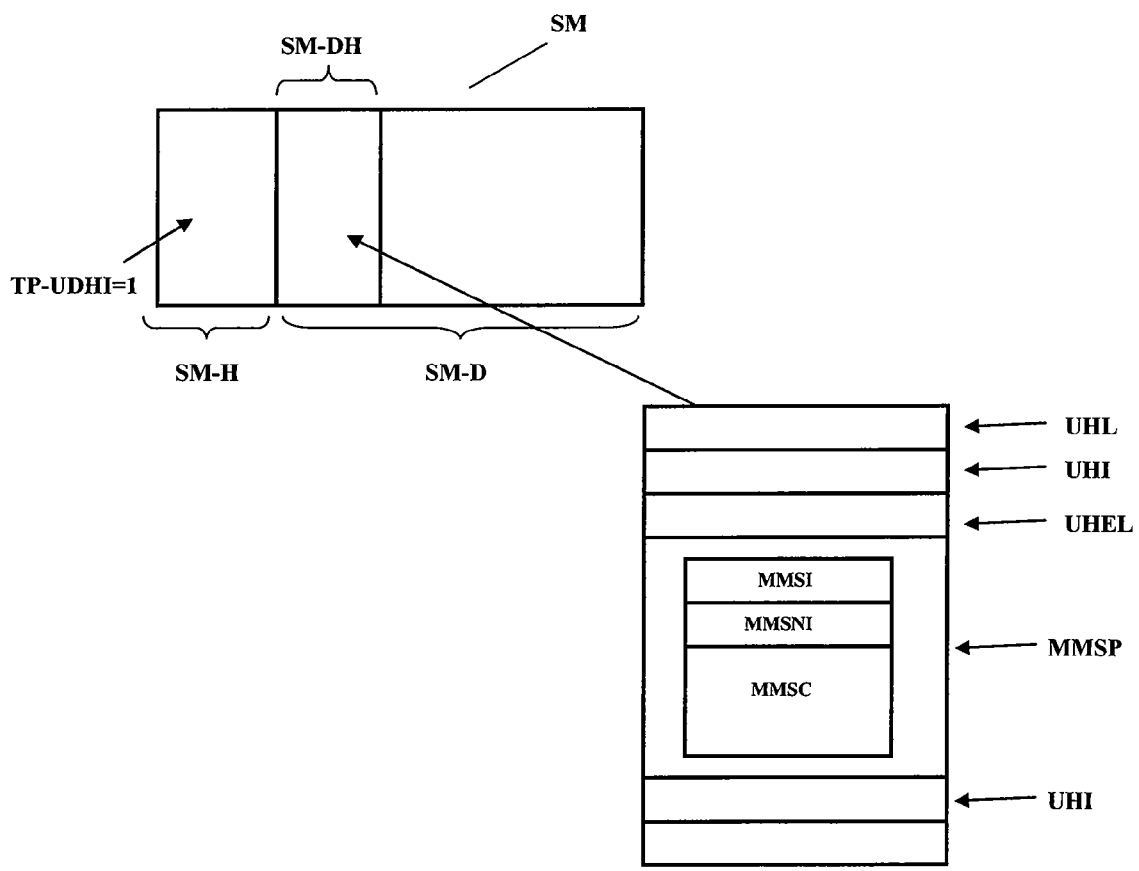
FIG. 2 shows the structure of an SMS short message of the first type A in GSM, in accordance with a second exemplary method of the present invention.

FIG. 2 shows the structure of an SMS short message of the first type A in GSM, in accordance with a second exemplary method of the present invention.

The exemplary embodiment shown in FIG. 2 is similar to the first exemplary embodiment described above, except that, in the example for the MMS session establishment, it includes a WCMP (wireless control message protocol) user data header having an embedded MMS protocol.

Identification UHI of this user data header is executed in the form of hexadecimal 09, in accordance with the standards GSM 03.40 V7.1.0 (November 1998) Technical Realization of the Short Message Service (SMS); Point-to-Point (PP) and 3G 23.040 V3.2.0 (October 1999) Technical Realization of the Short Message Service (SMS); and Point-to-Point (PP).

As shown in FIG. 2, user data header SM-DH begins with user data header length UHL, followed by identification UHI of the first header, which may include, for example, hex. 09 for WCMP. This is then followed by the length of the user data header element UHEL, which may include, for example, the necessary length of the WCMP header (including the entire embedded MMS protocol). Finally, the WCMP fields in the MMS protocol are provided, which are referred to as MMSP. These include a designation MMSI (also called an MMS identifier), which indicates that an MMS protocol is implemented using the WCMP field. The subsequent identifier MMSNI indicates the type of MMS protocol. It therefore specifies the type of MMS message, and consequently corresponds to the content of parameter UHI in the first exemplary embodiment. Parameter MMSC indicates the user ID and profile ID in the example of MMS session establishment.

Similarly to the first exemplary embodiment according to the present invention, a unique indicator should be defined for each type of message.

A mapping table may appear as follows:

TABLE 2

Exemplary Assignment of MMSNI Codes

| Type of Dedicated MMS Message | MMSNI-Code |
| --- | --- |
| MMS user message | 0 |
| MMS notification | 1 |
| MMS session establishment | 2 |
| MMS receipt (of establishment) | 3 |
| MMS explicit notification-query | 4 |
| MMS ACK/NACK of submission (1) | 5 |
| MMS ACK/NACK of submission (2) | 6 |
| MMS ACK/NACK of delivery | 7 |
| MMS pull-push | 8 |

Figure 3:
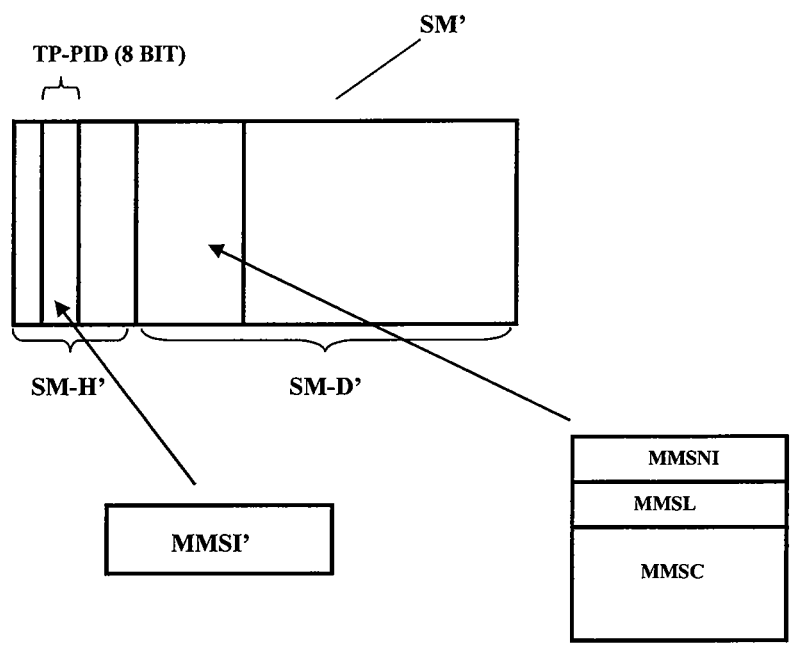
FIG. 3 shows the structure of an SMS short message of the second type B in GSM, in accordance with a third exemplary method of the present invention.
Figure 4:
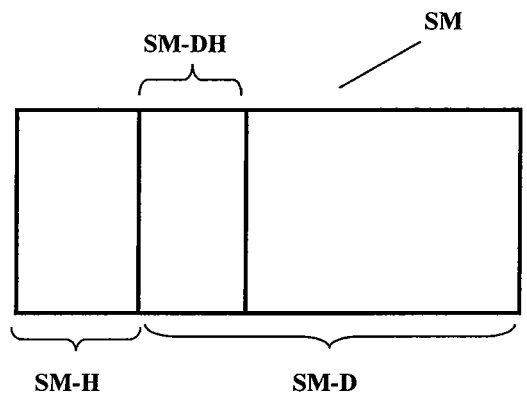
FIG. 4 shows the principal structure of a first type A of SMS in GSM.
Figure 5:
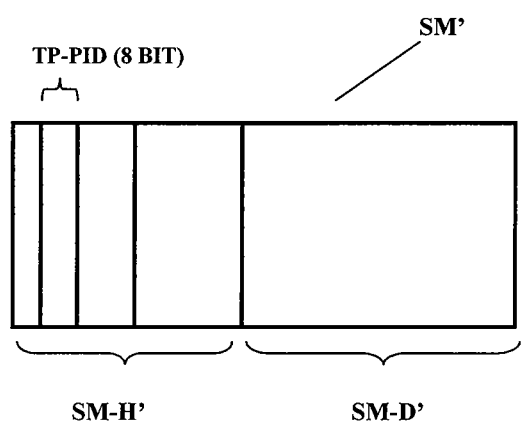
FIG. 5 shows the principal structure of a second type B of SMS short message in GSM.

FIG. 3 shows the structure of an SMS short message of the second type B in GSM, in accordance with a third exemplary method of the present invention.

While the first and second exemplary embodiments described above use the user data header to produce MMS notifications, the TP-PID may be used for identifying such a notification. If so, the service center participates in the protocol whereas, in the first and second exemplary embodiments described above, the service center only forwards the data in a transparent manner.

In the third exemplary method according to the present invention, it is presumed that the MMS relay executes a special MMS protocol with the SMSC, e.g., notifications for the user are transmitted from the MMS relay to the SMSC in a special MMS format, to transmit these messages to the user or transmit notifications from the user to the MMS relay, via the SMSC.

In the SMSC, these notifications are then converted from SMS into the MMS format (and vice versa), in a manner similar to how SMS is converted to fax.

For this purpose, parameter TP-PID in SMS short message SM' is set to a specific value MMSI for the MMS service. This specification establishes, for both the transmitter and receiver, that further information specific to MMS protocol follows in the user data. The appearance of these may be as follows.

An additional MMS message identifier MMNSI' may indicate the type of notification, e.g., an MMS session establishment, which is sent from the user to the MMS relay. For example, these identifiers MMNSI' may again be constructed similar to the parameters MMSNI in Table 2, and may use 8 bits for display. A field MMSL, which may be, e.g., 8 bits wide, defines the length of the following MMS information items, MMSC. These are independent of the type of notification. With respect to the MMS session establishment, the user ID and the ID of the desired profile may be communicated in MMSC, as described above.

Depending on whether telematic interworking or message handling is desired, the TP-PID may be in the form <001xxxxx> (e.g. <00110011>) or <01xxxxxx> (e.g. <01001000>).

Although three exemplary methods according to the present invention are described above, the present invention is not limited to these exemplary embodiments, but rather may be modified in various ways.

For example, the present invention is not limited to telecommunications networks and their services. In addition, the structure of short messages may be varied. Other criteria, such as network utilization, etc., may also be used to determine which messages of the first message service are to be sent by the second message service.

What is claimed is:

1. A method for transmitting messages in a telecommunications network including a Multimedia Messaging Service (MMS) and a Short Message Service (SMS), said messages including MMS messages in an MMS message format and SMS messages in an SMS message format specified by Global System for Mobile Communications, the method comprising:

structuring the SMS message to include a header portion, a data portion, and a user data header, wherein the user data header is within the data portion;

including an MMS message in said data portion of said SMS message;

including in said data portion of said SMS message an MMS message type identifier, said MMS message type identifier providing an identification of a type of said MMS message, the type of said MMS message selected from an MMS notification message, an MMS notification-query and an MMS acknowledgement message;

including in said data portion of said SMS message an MMS identifier for indicating that said MMS message format is used for said MMS message in said;

wherein each of the MMS message type identifier and the MMS identifier is distinct from the MMS message; and wherein the SMS message is sent between a transmitter and a receiver without line-oriented transmission.

2. The method of claim 1, wherein at least one of the MMS message type identifier and the MMS message is included in the user data header of the SMS message.

3. The method of claim 2, wherein the header portion of the SMS message includes a user data header presence identifier for indicating that the user data header is present within the data portion.

4. The method of claim 1, wherein sending the MMS message within the SMS message is performed in response to a cellular phone sending a message in the MMS message format.

5. The method of claim 1, wherein the receiver is at least a portion of a cellular phone.

6. The method of claim 1, wherein the receiver is at least a portion of an SMS service center.

7. The method of claim 1, wherein the receiver is at least a portion of an MMS relay.

8. The method of claim 1, wherein the transmitter is at least a portion of an SMS service center.

9. The method of claim 1, wherein the transmitter is at least a portion of an MMS relay.

10. The method of claim 1, wherein the MMS message type identifier and the MMS message are included in the user data header of the SMS message; and wherein the user data header further includes a user data header identifier indicating that the user data header is formatted according to the wireless control message protocol (WCMP).

11. The method of claim 10, wherein the header portion of the SMS message includes a user data header presence identifier for indicating that the user data header is present within the data portion.

12. The method of claim 1, wherein the MMS message type identifier and the MMS message are included in an element of the user data header of the SMS message; and wherein the user data header further includes a user data header identifier indicating that the element of the user data header is formatted according to the wireless control message protocol (WCMP).

13. The method of claim 12, wherein the header portion of the SMS message includes a user data header presence identifier for indicating that the user data header is present within the data portion.

14. A method for transmitting messages in a telecommunications network including a Multimedia Messaging Service (MMS) and a Short Message Service (SMS), said messages including MMS messages in an MMS message format and SMS messages in an SMS message format specified by Global System for Mobile Communications, the method comprising:

structuring the SMS message to include a header portion, a data portion, and a user data header, wherein the user data header is within the data portion;

including an MMS message in said data portion of said SMS message;

including in said data portion of said SMS message an MMS message type identifier, said MMS message type identifier providing an identification of a type of said MMS message, the type of said MMS message selected from an MMS notification message, an MMS notification-query and an MMS acknowledgement message;

including in said data portion of said SMS message an MMS identifier for indicating that said MMS message format is used for said MMS message in said;

wherein each of the MMS message type identifier and the MMS identifier is distinct from the MMS message; and wherein the SMS message is sent between a transmitter and a receiver using line-oriented transmission.

15. The method of claim 14, wherein at least one of the MMS message type identifier and the MMS message is included in the user data header of the SMS message.

16. The method of claim 14, wherein sending the MMS message within the SMS message is performed in response to a cellular phone sending a message in the MMS message format.

17. The method of claim 14, wherein the receiver is at least a portion of a cellular phone.

18. The method of claim 14, wherein the receiver is at least a portion of an SMS service center.

19. The method of claim 14, wherein the receiver is at least a portion of an MMS relay.

20. The method of claim 14, wherein the transmitter is at least a portion of an SMS service center.

21. The method of claim 14, wherein the transmitter is at least a portion of an MMS relay.

22. The method of claim 15, wherein the header portion of the SMS message includes a user data header presence identifier for indicating that the user data header is present within the data portion.

23. The method of claim 14, wherein the MMS message type identifier and the MMS message are included in the user data header of the SMS message; and wherein the user data header further includes a user data header identifier indicating that the user data header is formatted according to the wireless control message protocol (WCMP).

24. The method of claim 23, wherein the header portion of the SMS message includes a user data header presence identifier for indicating that the user data header is present within the data portion.

25. The method of claim 14, wherein the MMS message type identifier and the MMS message are included in an element of the user data header of the SMS message; and wherein the user data header further includes a user data header identifier indicating that the element of the user data header is formatted according to the wireless control message protocol (WCMP).

26. The method of claim 25, wherein the header portion of the SMS message includes a user data header presence identifier for indicating that the user data header is present within the data portion.

* * * * *